Oct. 3, 1961     L. C. MURRAY     3,002,494
AUTOMATED HEN BATTERY
Filed Dec. 14, 1959     2 Sheets-Sheet 1
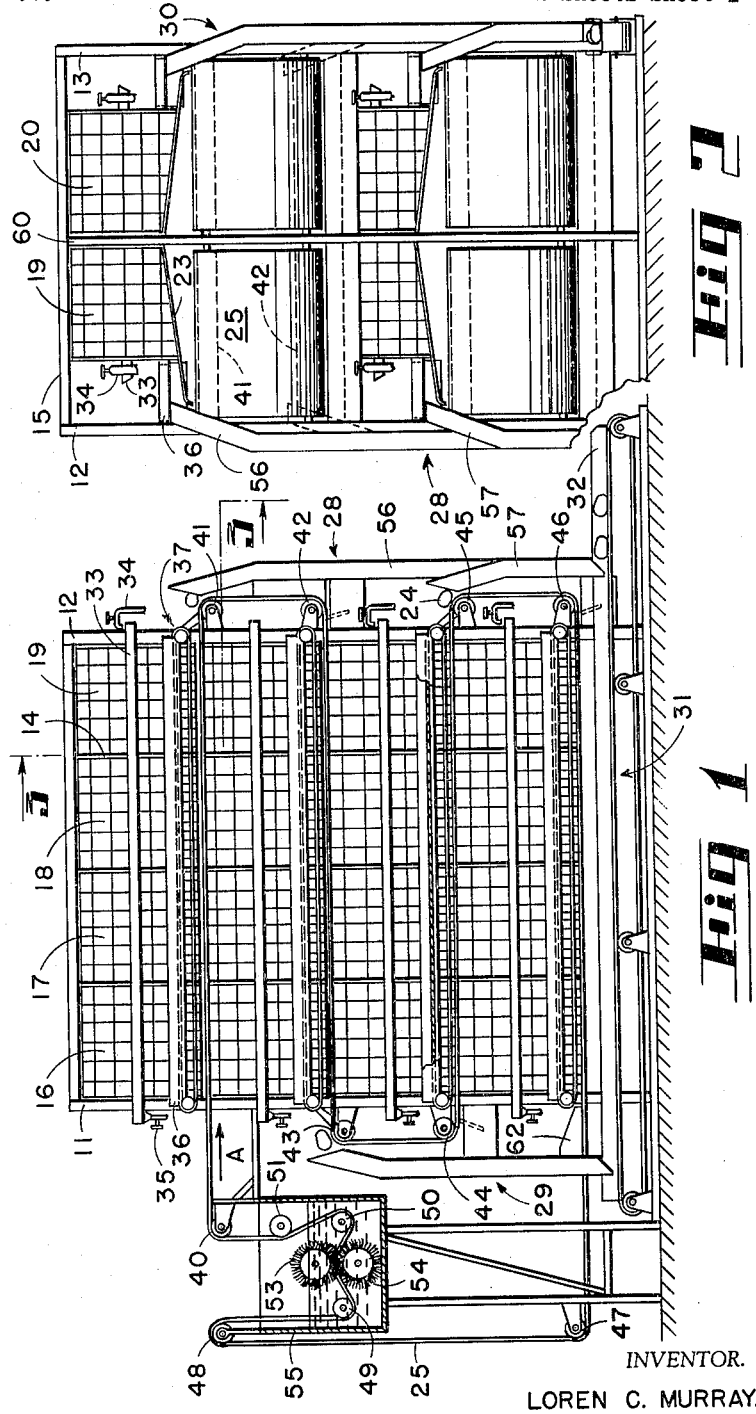
INVENTOR.
LOREN C. MURRAY.
BY
Charles M. Hogan
ATTORNEY.

Oct. 3, 1961　　　L. C. MURRAY　　　3,002,494
AUTOMATED HEN BATTERY

Filed Dec. 14, 1959　　　2 Sheets-Sheet 2

INVENTOR.
LOREN C. MURRAY.
BY Charles M. Hogan.
ATTORNEY.

3,002,494
AUTOMATED HEN BATTERY
Loren C. Murray, Rte. 4, Box 388A, Elkhart, Ind.
Filed Dec. 14, 1959, Ser. No. 859,326
1 Claim. (Cl. 119—48)

The present invention relates to hen batteries and specifically to improvements in the automation of hen batteries.

A principal object of the invention is to provide, in a hen battery, the combination of a cage having a grated and sloped bottom formed to facilitate the delivery of eggs laterally of the cage and the discharge of droppings vertically from the cage, together with conveying means for automatically delivering the eggs to a delivery point and removing the droppings, the combination further including means for isolating the eggs, during transport by the conveying means, from the droppings.

Another object of the present invention is to provide a plurality of such cages in a conveniently arranged battery, the conveyor means being common to a plurality of cages and functioning to deliver eggs from a plurality of zones to an egg chute system or gathering station.

A further object of the invention is to provide preferred and modified forms of egg chute for permitting the gravitational fall or mechanical transportation of eggs from one level to another without breakage.

For a better understanding of the present invention, together with other and further objects, advantages and capabilities thereof, reference is made to the following description of the accompanying drawings, in which:

FIG. 1 is a front elevational view of a preferred form of automated hen battery in accordance with the invention;

FIG. 2 is an end elevational view thereof;

Figure 3:
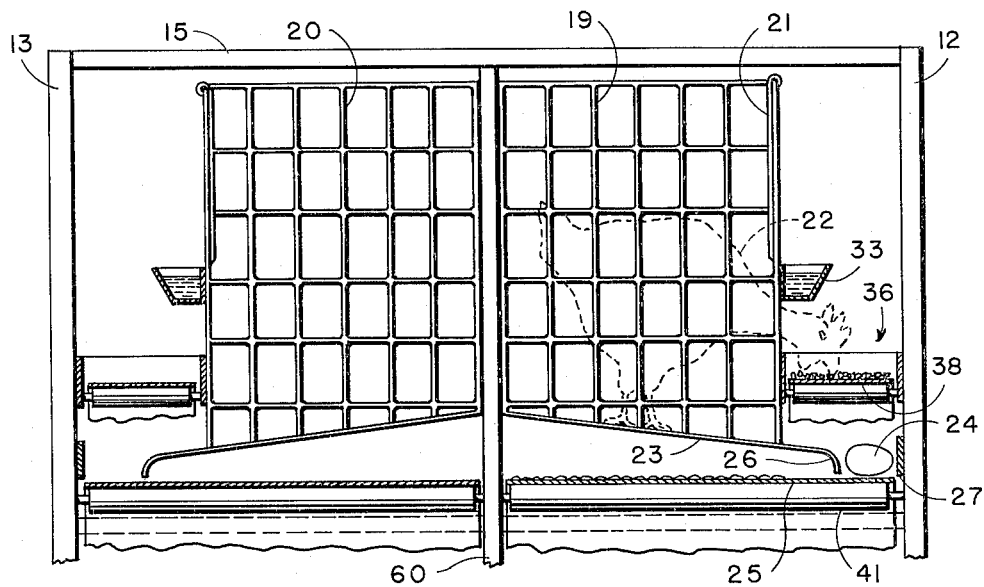
FIG. 3 is an elevational sectional view taken along the section line 3—3 of FIG. 1, looking in the direction of the arrows.

Referring now generally to FIGS. 1 and 2, the hen battery there shown comprises a framework consisting of a plurality of upright members such as 11, 12, 13 and 14, and a plurality of horizontal framework members such as 15. The hen battery comprises, by way of illustration, a frontal group of sixteen cages and a rear group of sixteen cages. Each group is arranged in four stacked rows of four cages each. Those cages in the top frontal row are indicated by the reference numerals 16, 17, 18 and 19. The cage immediately behind cage 19 is numbered 20.

Each cage, for example, cage 19 in FIG. 3, is formed with grated or wide-meshed front, left side, right side, rear and bottom members, and provided with a suitably hinged door 21, to permit a hen 22 to be placed in the cage or taken therefrom. The bottom 23 of the cage is sloped or inclined downwardly toward the front, in the manner shown in FIG. 3, to permit the gravitational discharge of freshly laid eggs. In accordance with the invention, each newly produced egg 24 is delivered from the cage in which it was laid, onto an isolated section of a conveyor belt 25. Isolation of this section is accomplished by a rounded flange 26 or lip on bottom 23. The flanges 26 of a plurality of cages in a row are suitably formed to provide a continuous flange throughout the length of the battery. There is secured to the vertical frame member 12 and to vertical members in alignment therewith an egg-stop member 27, so constructed that the flanges 26 and the stop member 27 define an isolated channel for the automated removal of eggs to an egg chute or gathering point generally indicated by the reference numeral 28. Several egg chutes such as 28, 29 and 30 permit the slow gravitational descent of the eggs from the several stacked rows in the frontal cages of the battery to a common conveyor system 31 which delivers them to an outlet point 32.

Disposed in front of the four cages in a typical row is a water trough 33, suitably provided with a water supply spigot 34 and drain 35. Also disposed in front of each row of cages is a feed trough 36 which may be automated by the provision of suitable hopper arrangements and a belt conveyor 37, the belt 38 of which is definitive of the bottom of the feed trough.

Referring again to FIG. 3, it will be understood that while eggs are carried by the outboard portion of the belt 25, channelized by members 26 and 27, the droppings from the hen fall onto the inboard portion of the conveyor belt which is immediately below the cage 19, so that the same belt 25 automatically transports eggs and droppings. These functions are performed by the same belt 25 with respect to all of the sixteen cages in the four front rows.

Belt 25 is positioned for four horizontal runs by rollers 40, 41, 42, 43, 44, 45, 46 and 47, and an additional combination of rollers 48, 49, 50 and 51 functions to lead the continuous belt 25 between suitable scraping rollers 53 and 54, the latter being immersed in an antiseptic liquid in a tank 55. The scraping rollers 53 and 54 remove residue from the droppings and render the belt sanitary. This device may be supplemented by known arrangements, which need not be shown herein, for the gross removal of droppings from conveyor belts in hen batteries.

The upper horizontal run of belt 25 moves to the right as indicated by the arrow A in FIG. 1, and causes eggs to be disposed in the mouth of the upper section 56 of the egg chute device 28. The immediately lower horizontal run of the belt causes eggs to be dropped into a similar egg chute 29. The next run of the belt places eggs in lower section 57 of chute 58. Eggs are deflected from the lowermost run of the belt 25 over to the common conveyor 31 by a suitable deflector 62.

It will be understood that the rear group of sixteen cages and associated conveyor belt and other elements is arranged in the same manner as the front group described above. Each of the cages is hung from a suitable upstanding frame member such as 60.

Figures 4, 5:
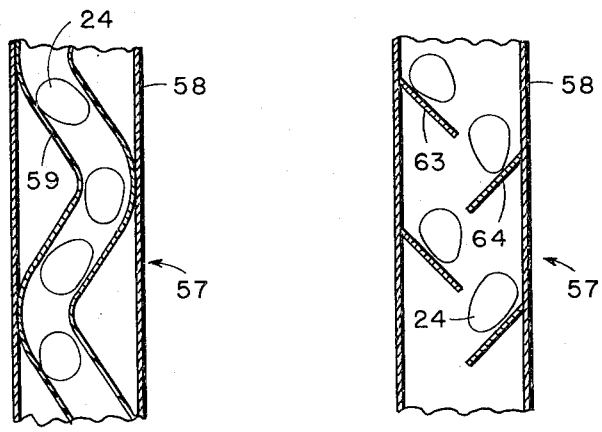
FIGS. 4 and 5 are longitudinal cross sectional views of preferred and alternate forms, respectively, of egg chutes suitable for use in the FIG. 1 embodiment.

Reference is made to FIG. 4, a section of a suitable egg chute 57. It comprises an upright outer jacket member 58 and a sinuous inner tubular member 59 having a cross section sufficient only to permit the free passage of eggs therethrough. The sinuous passage defined by member 59 sufficiently slows the descent of the eggs to prevent their breaking. In the alternative, this passage may be defined by a succession of staggered and opposed inclined baffles such as those numbered 63 and 64 in FIG. 5.

From the foregoing description, it will be seen that the invention provides full automation of a hen battery. Water and feed are automatically made available to the hens in controlled quantities. The droppings are automatically transported away from the cages and the eggs are automatically transported to a common delivery point. The advantage of this arrangement is that eggs can be produced with a minimum of attendance on the part of the poultry man and with a maximum of sanitation, freedom from odors, and freshness and quality of the eggs.

While the preferred embodiment of the invention involves a plurality of rows of cages, one row stacked upon another, together with continuous conveyor belting for handling both the droppings and the eggs from the entire battery, it is within the purview of the invention to provide a single row of cages with a common conveyor, or to stack several rows of cages upon each other, each with its individual conveyor belt.

While there has been shown and described what is at present considered to be the preferred embodiment of the invention, it will be understood by those skilled in the art that various modifications and changes may be made therein without departing from the true scope of the invention as defined in the appended claim.

Having fully disclosed my invention, I claim:

In a caged-hen egg producing battery, the combination of: a supporting frame; a plurality of hen-confining cages mounted on the frame and arranged in two registering stacks of rows of cages; each cage having a bottom member which is formed of wide-mesh grating to permit the passage of droppings, each said member being outwardly and downwardly extended and sloped to provide an incline for the discharge of eggs, the extensions of all of the members in each row terminating in a substantially continuous depending lip; conveying means including a first conveyor belt for the first stack and a second conveyor belt for the second stack; pulleys for supporting the belts so that each belt has a horizontal run adjacent each row of cages; each horizontal run extending beneath the cages in its associated row to pick up droppings, and also extending outboard of the row of cages and lip to pick up eggs, so that the continuous lip isolates the eggs from the droppings; and means including chutes adjacent the exit ends of the outboard portions of each run for conveying the eggs to a common point.

References Cited in the file of this patent

UNITED STATES PATENTS

| | | |
|---|---|---|
| 2,264,156 | Apple | Nov. 25, 1941 |
| 2,294,025 | Dagg | Aug. 25, 1942 |
| 2,536,621 | Arnold | Jan. 2, 1951 |
| 2,674,226 | Manning | Apr. 6, 1954 |
| 2,886,173 | Scott | May 12, 1959 |